J. W. CRANNELL.
Axle.
No. 35,870.
Patented July 15, 1862.
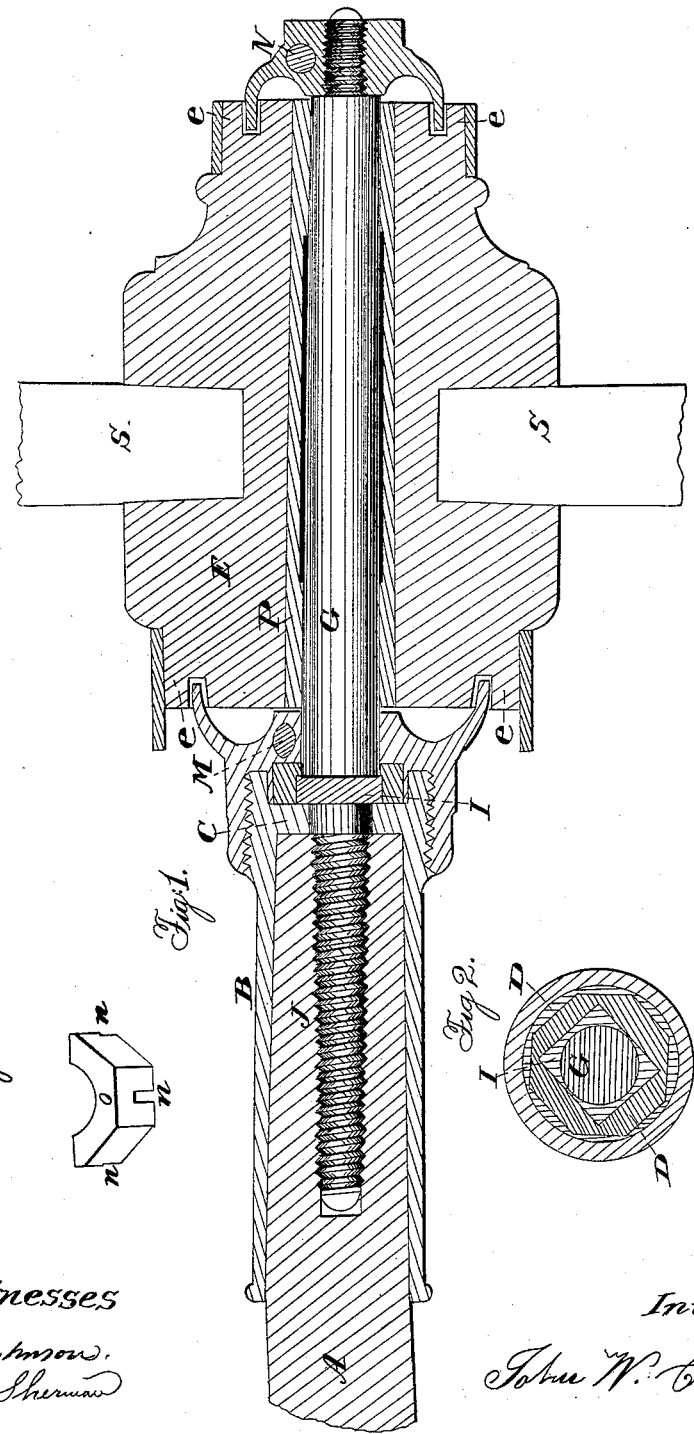

UNITED STATES PATENT OFFICE.

JOHN W. CRANNELL, OF SPRINGPORT, MICHIGAN.

IMPROVEMENT IN AXLES FOR VEHICLES.

Specification forming part of Letters Patent No. 35,870, dated July 15, 1862.

*To all whom it may concern:*

Be it known that I, JOHN W. CRANNELL, of Springport, in the county of Jackson and State of Michigin, have invented a new and useful Improvement on Vehicle-Axles; and I do hereby declare that the following is a full, clear, and exact description of the construction and operation of the same, reference being had to the annexed drawings, making a part of this specification, in which—

Figure 1 is a longitudinal section. Fig. 2 is a plan view of nut and axle, and Fig. 3 a perspective view of sectional washer.

Similar letters indicate corresponding parts in all the figures.

This improvement consists in banding each end of an ordinary wooden axle-tree with a cast shoe, at the outer extremity of which a polygonal shaped recess is formed to receive a finished metal axle, which is locked by a peculiarly-formed nut and "washer" in such manner as to be readily secured and adjusted, and also to form, in connection with the cap-nut, an effectual bar to the admission of grit to the axle and a lasting means of lubrication, the several parts being constructed and arranged in the manner I am now about to describe.

A represents a wooden axle-tree of the usual semi-elliptical form.

B is a cast-iron "shoe," provided with a deep socket (slightly tapered) of a form and size to correspond with said wooden axle-tree A, which is accurately fitted to the socket, so as to drive snugly home against a plate, C, cast in it near the outer end of said shoe. This outer end of the shoe is somewhat enlarged and circular in form, and has a screw-thread cut on it externally, which is right or left handed for each proper end of the axle.

Outside of the plate C, and within the limits of the threaded portion of the shoe at its extreme outer end, a recess or socket, D, is formed, usually octagonal in form, as may be seen in Fig. 2, for reasons to be hereinafter explained.

E represents the wheel-hub having an ordinary cast-iron chambered "pipe-box," P, and S S broken sections of two of the spokes.

G is the axle, (on which the wheel turns,) which is usually made of wrought-iron and turned up in the lathe. This axle is provided with a four-square collar (if the recess D is an octagon) in a suitable position, as seen at I, and projecting from this collar is a slightly-tapering shank, J, cut with a coarse-threaded screw, for screwing it through a hole in the plate C into the end of the wood axle-tree A, previously bored for the purpose.

The square collar I abuts against the outer side of the plate C and is firmly secured to it, and the axle kept from turning or getting loose by means of a peculiarly-shaped nut, M, which loosely encircles the axle, and is screwed onto the threaded end of the shoe B against a washer, o, fitted to the octagonal recess D.

The washer has angular notches n n n n cut through a portion of its thickness to form bearings against the projecting corner faces of the collar I, and is so fitted that those portions not cut away will have a bearing also against the plate C, the position of the collar in relation to the polygonal recess in which it is secured being such as to enable this to be done to the best advantage. For facility in trimming the angular notches n n, &c., I usually cast the washer in two halves, one being seen at Fig. 3.

The nut M is circular in form, excepting a central portion made hexagonal to admit a wrench, and is gradually enlarged in diameter next the hub, and is grooved out at x on its face, (to form a chamber for lubricating material,) in such manner as to leave the outside a mere shell projecting horizontally beyond, the rim left round the axle G to serve as a shoulder for the hub.

N is the "cap" or retaining-nut. It is similar in general construction to M, but is proportionally smaller, and is screwed on the outer end of the axle G against a shoulder, proper allowance being made for end-play.

Grooves e e are turned out in the ends of the hub E to admit the projecting shells of the nuts M and N sufficiently close to exclude grit from the axle and yet free enough to prevent rubbing action.

This improvement is applicable to any description of wheel-vehicles, and possesses many advantages over axles made entirely of iron, being much lighter, and inexpensive both in first cost and incidental repairs, as the wooden part can be easily and cheaply renewed in case of injury. It will be seen, too, that the iron axle G can be readily adjusted to a new relative position when worn flat on the bearing side by merely unscrewing it and placing a backing of sheet metal behind the collar and washer, or a similar backing may be so fitted in the first construction and then removed when it becomes necessary to turn the axle half round by reason of wear.

I wish to be understood that I do not claim the screw-thread on the shank J as essential, for the shoe B may be secured by rivets to the wood and a plain shank driven into the hole with probably equal advantage.

What I claim as my invention, and desire to secure by Letters Patent, is—

Connecting an iron axle with a wooden axle-tree by the use of the shank J and collar I, in combination with the shoe B, lock-nut M, and washer O, substantially as and for the purposes described.

JOHN W. CRANNELL.

Witnesses:
GEORGE JOHNSON,
FRANCIS W. SHEARMAN.